United States Patent [19]

Kloss

[11] Patent Number: 4,743,004
[45] Date of Patent: May 10, 1988

[54] COPING JIG

[75] Inventor: Gary L. Kloss, 3635 S. 85th St., Milwaukee, Wis. 53228

[73] Assignee: Gary L. Kloss, Milwaukee, Wis.

[21] Appl. No.: 25,431

[22] Filed: Mar. 12, 1987

Related U.S. Application Data

[63] Continuation-in-part of Ser. No. 831,544, Feb. 14, 1986, abandoned.

[51] Int. Cl.$^4$ .................................................. B25B 1/08
[52] U.S. Cl. ..................................... 269/296; 269/303; 269/315; 269/900
[58] Field of Search ....................... 269/41, 42, 152, 55, 269/902, 900, 261, 283, 88, 296, 303, 315; 33/526

[56] References Cited

U.S. PATENT DOCUMENTS

| | | |
|---|---|---|
| 597,013 | 1/1898 | Miller . |
| 918,192 | 4/1909 | Palmer . |
| 1,004,920 | 10/1911 | Shire . |
| 1,697,497 | 1/1929 | Drusch . |
| 2,343,448 | 3/1944 | Fay . |
| 2,447,889 | 8/1948 | Adler ................................. 269/900 |
| 2,476,721 | 7/1949 | Garner et al. . |
| 2,621,807 | 12/1952 | Rendich ............................. 269/900 |
| 3,245,678 | 4/1966 | Riehle ................................ 269/900 |
| 4,014,236 | 3/1977 | Neal . |
| 4,157,819 | 6/1979 | Meyer ................................ 269/900 |
| 4,158,523 | 6/1979 | Schotzko . |
| 4,593,804 | 6/1986 | Kinsey et al. ..................... 269/900 |

Primary Examiner—Robert C. Watson
Attorney, Agent, or Firm—Quarles & Brady

[57] ABSTRACT

A jig for coping crown molding includes a base with a pair of right-angled isosceles triangular support blocks mounted on dowels to the base and with their faces that are at a 45° incline to the base normally facing forward on the base. In one embodiment, the base has a rod which mounts one or more clamps. The clamps hold a length of crown molding with one of its flat rear surfaces resting on the base and with its inclined flat rear surface against the inclined faces of the support blocks. An end of the crown molding piece projects beyond the base where it is accessible for hand coping. The proper shape of the end of the crown molding for corner junctions can then be achieved using wholly vertical saw strokes. In another embodiment, the crown molding is held against the inclined surfaces of the support blocks by an abutment that is adjustably positioned on the base and spaced from the support blocks. The support blocks are reversible to present an upright face towards the front of the base for holding other types of molding and workpieces.

6 Claims, 3 Drawing Sheets

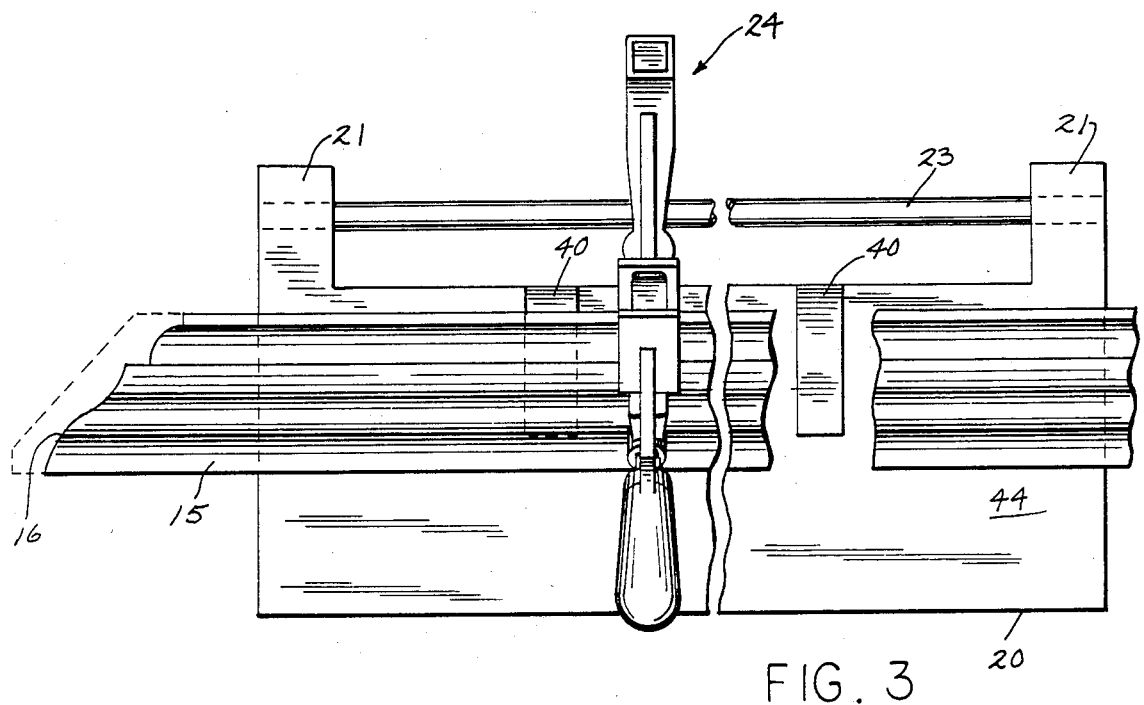
FIG. 3
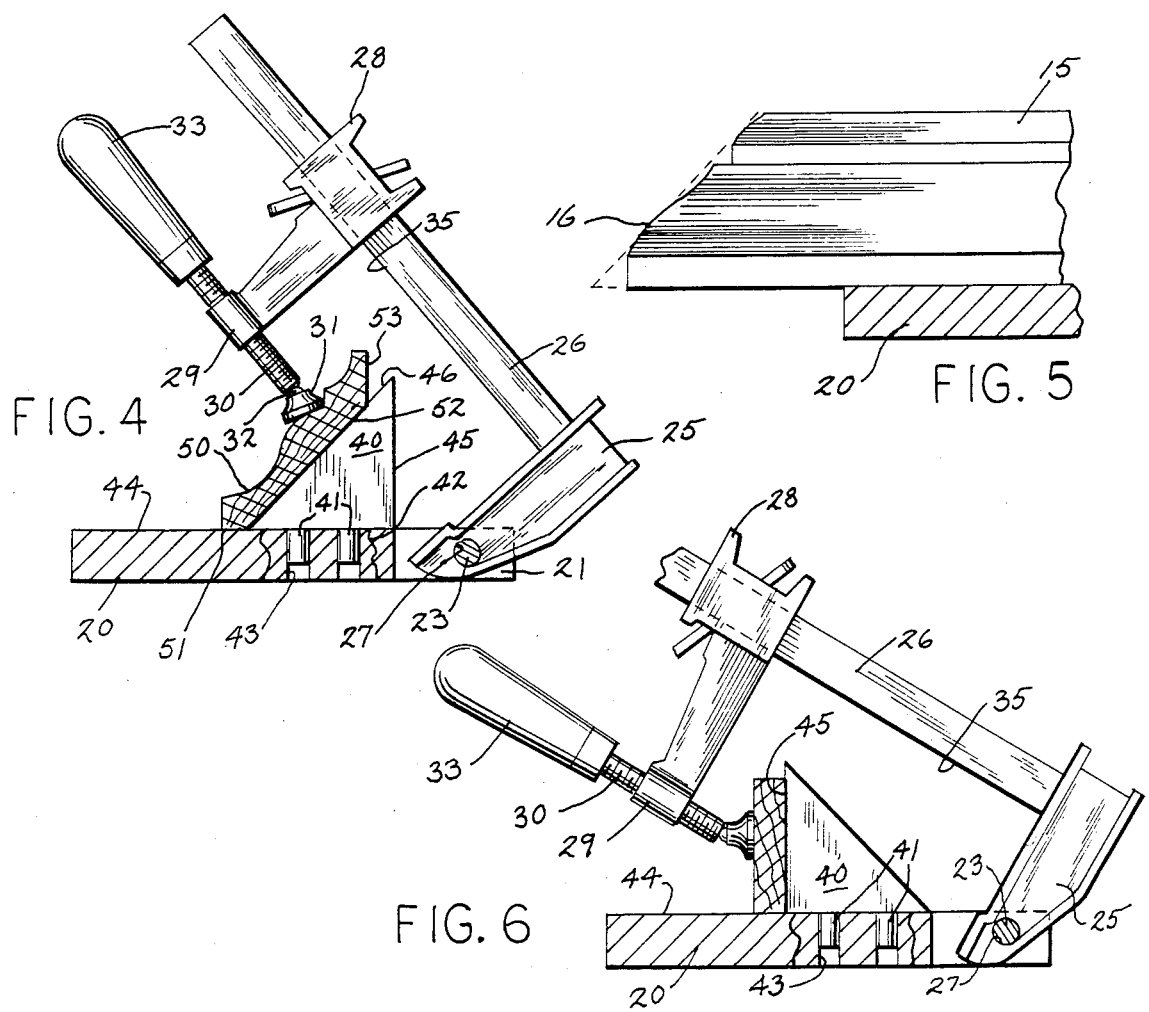
FIG. 4
FIG. 5
FIG. 6

COPING JIG

This is a continuation-in-part of my copending application Ser. No. 831,544, filed Feb. 14, 1986, now abandoned.

BACKGROUND OF THE INVENTION

This invention relates to jigs for woodworking, and particularly to a coping jig that facilitates and simplifies the hand forming of the abutting corners of crown molding.

Crown moldings are typically used along the junctions of walls and ceilings to provide a decorative feature and also to cover the junction. Crown moldings have three flat rear surfaces, one of which is mounted against the ceiling, one of which is mounted against the wall, and the third of which is at 45° to the other two. When two pieces of crown molding are to be fitted at a corner, a mitered joint is not generally used because of the difficulty of making precise mitered cuts and the unlikelihood that the two walls are exactly 90° to each other. Instead, carpenters will typically extend one of the crown molding pieces flush to the abutting wall and fit the other intersecting crown molding piece to the face profile of the first. The second piece must be provided with a carefully crafted end to match the face profile of the first piece.

Previously, the hand-fitted end of the intersecting crown molding piece has been formed by first providing a rough cut at a 45° angle across the face of the crown molding and then laying the crown molding with its 45° back surface flat on the horizontal surface of a table or other support. Then the end is hand-finished using a coping saw. This process requires considerable trial and error and forces the carpenter to work at awkward angles to the workpiece in order to achieve the desired result.

I have developed a jig that mounts and holds a piece of crown molding in a proper attitude so that the hand coping is greatly simplified and the trial and error necessary to achieve the desired fit is greatly reduced or eliminated entirely.

SUMMARY OF THE INVENTION

In accordance with the invention I provide a coping jig that includes a base, a pair of spaced support blocks rising from the base and each having a face extending at 45° from the base, and means to support a length of crown molding with one of its back surfaces resting upon the top of the base, with its 45° back surface flush against the support faces, and with an end to be coped extending beyond the base.

In accordance with one preferred embodiment, the support means comprises a clamp that may be mounted for longitudinal movement along a rod mounted in the base. In a second embodiment, the support means comprises a removable abutment that is mounted on the base parallel to the support blocks and adjusted to receive an edge of the crown molding in the space between the abutment and the support blocks. In either embodiment, the support blocks may be removably mounted to the base and provided with a second operative surface which is upright relative to the base. The position of the blocks can then be reversed and the jig can function to hold other moldings and pieces to be sawed.

It is a pricinpal object of the invention to provide a jig that greatly simplifies the formation of the handcrafted end of abutting crown molding.

It is another object of the invention to provide such a jig which is simple in construction and versatile in use to accomodate the holding and mounting of other shapes and forms of wood.

The foregoing and other objects and advantages of the invention will appear from the following detailed description of preferred embodiments. In the description reference is made to the drawings which illustrate the preferred embodiments.

BRIEF DESCRIPTION OF THE DRAWINGS

FIG. 3 is a top plan view of the jig of FIG. 2, with portions broken away and foreshortened for purposes of illustration and showing the end of the crown molding workpiece before and after coping;

FIG. 4 is a side view of the jig of FIG. 3 with portions and sections taken in the plane of the line 4—4 of FIG. 3;

FIG. 5 is a partial front view in elevation of the jig of FIG. 2 showing the end of the crown molding workpiece before and after coping;

FIG. 6 is a view similar to FIG. 4 but showing the jig used to support a piece of wood of rectangular cross section;

DETAILED DESCRIPTION OF THE PREFERRED EMBODIMENTS

Figure 1:
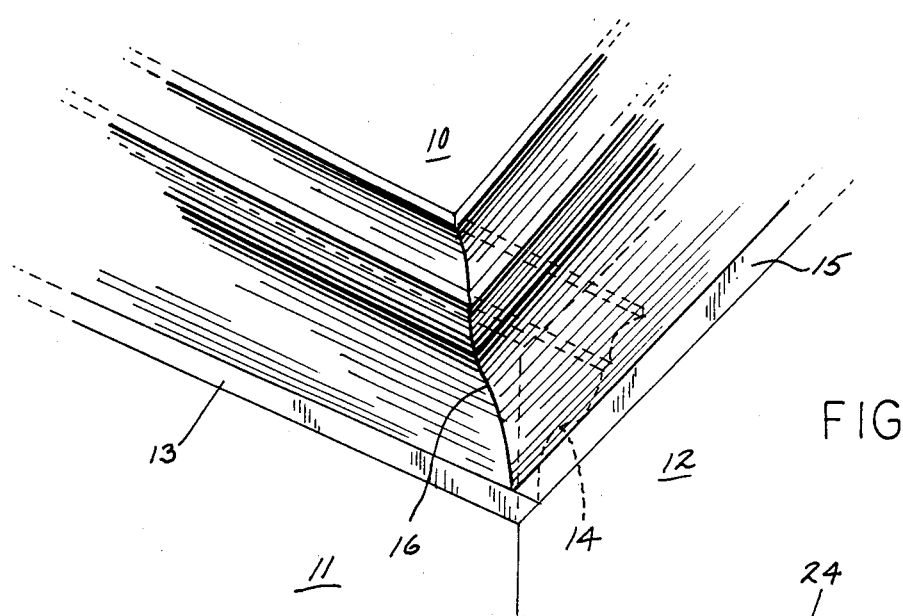
FIG. 1 is a view in perspective of a crown molding installation at the corner junction of a ceiling and walls.
Figure 2:
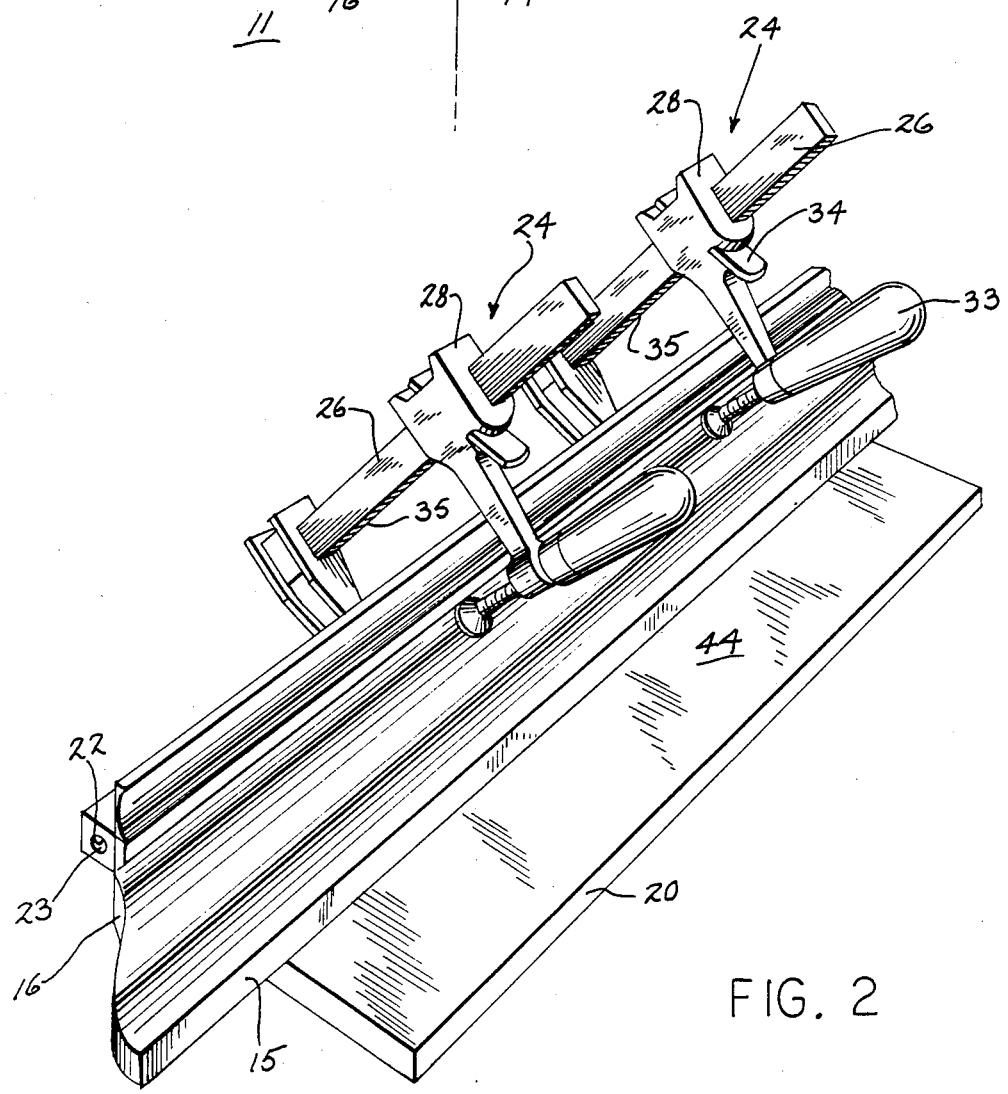
FIG. 2 is a view in perspective of a jig in accordance with the invention with a piece of crown molding in place upon the jig.

FIG. 1 illustrates the manner in which crown molding is fitted into a corner junction of a ceiling 10 and two walls 11 and 12. One length 13 of crown molding has its end 14 cut flush to abut the wall 12. The intersecting length 15 of crown molding has an end 16 which is carefully handcrafted to match the face profile of the first crown molding 13 so that a smooth junction is formed without gaps. It is the function of the jig of the present invention to assist in the forming of the end 16 of the intersecting crown molding 15.

The jig includes a flat base plate 20 which is illustrated as being made of wood but which could be made of any suitable rigid material. The rear edge of the base 20 is removed except at the ends of the base to form a pair of rearwardly extending legs 21 that are drilled with aligned bores 22. A metal rod 23 is mounted at its ends in the bores 22. The rod 23 supports clamps indicated generally by the numeral 24. The clamps 24 are of known construction and are commercially available.

Each clamp 24 has a short leg 25 from which a support leg 26 extends. The short legs 25 have been modified by providing a bore 27 so that the clamps can ride upon the rod 23. Each support leg 26 mounts a longitudinally movable clamp arm 28 which has a threaded end 29 that receives a threaded shaft 30 which has a shoe 31 pivotally mounted on a ball 32 on one end and a handle 33 on the other end. Spring loaded tilt plates 34 are mounted in the clamp arm 28 surrounding the support leg 26 and engage striations along the underside 35 of the support leg 26 to adjust and hold the position of the clamp arm 28 along the length of the support leg 26 in a known manner.

A pair of right angled isosceles triangular support blocks 40 each have a pair of dowels 41 extending downwardly from their flat bottom face 42. The dowels 41 are removably received in holes 43 provided through the base 20. The flat bottom face 42 of each block 40 rests upon the flat top surface 44 of the base 20 and holes 43 are aligned so that the pair of blocks 40 will be located along a line parallel to the rod 23 on the base 20. As seen in FIGS. 4 and 6, the blocks 40 each have an upright rear face 45 and an inclined front face 46 which is at a 45° angle to the other faces 42 and 45 and to the top surface 44 of the base 20.

As shown in FIG. 4, a typical crown molding 15 has an ornamental front profile 50 and three flat rear surfaces 51, 52 and 53. The surfaces 51 and 53 at the edges of the crown molding are at right angles to each other and the main rear flat surface 52 is at a 45° angle to the other two.

When the jig is used for holding crown moldings, the piece of molding 15 is supported with one of its rear surfaces 51 flat upon the top surface 44 of the base 20. The 45° back surface 52 of the crown molding rests against the inclined face 46 of the two support blocks 40 and the end 16 of the crown molding to be fashioned extends beyond the base 20 (see FIGS. 3, 4 and 5). The clamps 24 hold the crown molding 15 in place against the blocks 40. In this position, the projecting end 16 of the crown molding 15 can be properly fashioned with a coping saw by making wholly vertical strokes. Such vertical strokes will result in all surfaces of the end 16 being vertical while held in the jig and that is the correct shape for the edge 16 so that it will perfectly match with the face profile of an intersecting crown molding. To prepare the crown molding, a 45° cut is first made as shown by the dotted line of FIG. 5. The vertical saw cuts will alter the end 16 from the condition shown by dotted lines in FIGS. 3 and 5 to that shown in solid lines.

As shown in FIG. 6, the blocks 40 can be removed and replaced with their upright surfaces 45 facing towards the front of the base 20. In that position the jig can be used to mount and support rectangular or round workpieces.

The blocks 40 are preferably made of wood but may be made of metal. The inclined and upright surfaces of such block may be provided with a roughened or serrated surface so as to better grip workpieces clamped against the surfaces.

Figure 7:
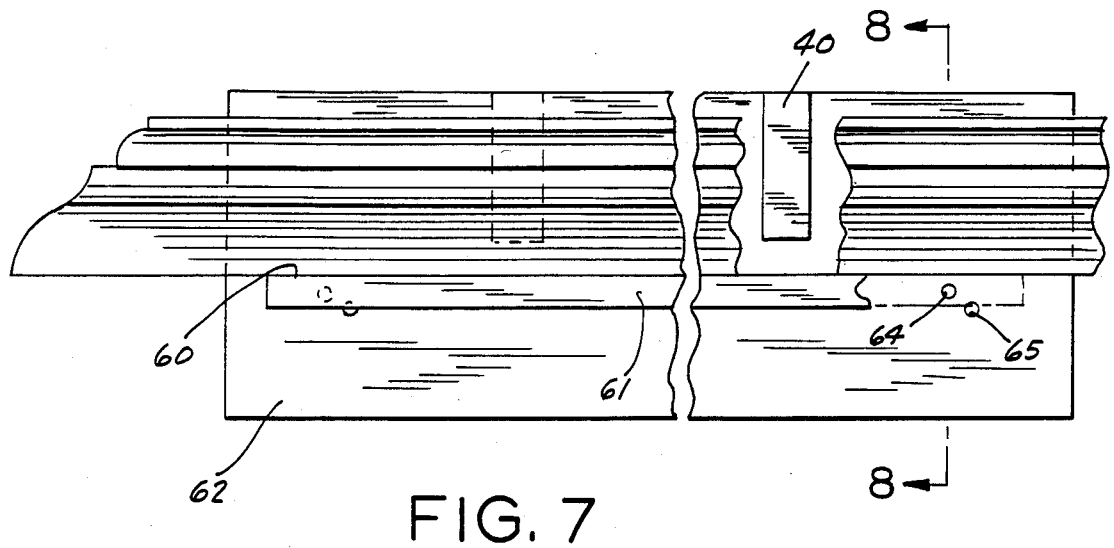
FIG. 7 is a top plan view of a second embodiment of the jig with portions broken away and foreshortened for purposes of illustration.
Figure 8:
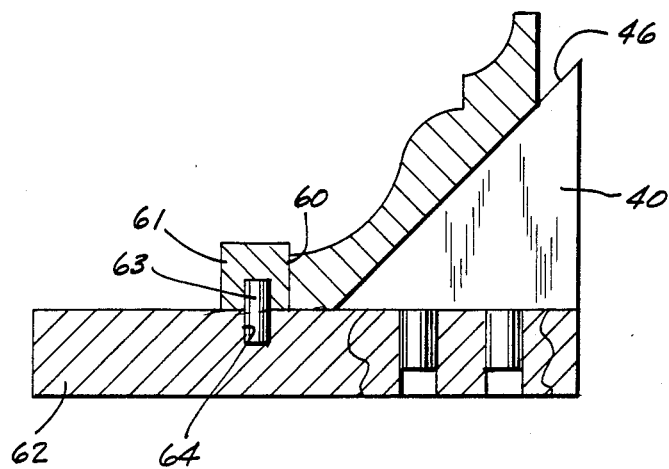
FIG. 8 is a side view of the jig of FIG. 7 with portions and sections taken in the plane of the line 8—8 of FIG. 7.

The second embodiment of FIGS. 7 and 8 is the same as the first embodiment except for the method of supporting the crown molding against the support blocks. Instead of using clamps as in the first embodiment, the crown molding is held in place by resting against an abutment. Specifically, the crown molding 15 rests against the inclined faces 46 of the support blocks 40 and has one edge resting against an upright face 60 of an elongated abutment 61. The abutment 61 is rectangular in cross-section and is mounted on a base 62 which also mounts the support blocks 40. The abutment 61 has a pair of depending pegs 63 which are received in alternative sets of bores 64 and 65 in the top surface of the base 62. The sets of bores 64 and 65 are spaced from the support blocks 40 distances that correspond to the standard sizes of crown moldings so that the molding will nestle in the space between the support blocks 40 and the abutment 61.

The base 62 in the second embodiment can be much simpler than that of the first embodiment because of the absence of a rod to mount the clamps. For most work, the abutment 61 provides sufficient anchor to hold the crown molding in place while it is being coped. It is also faster to use because no time is lost releasing and tightening clamps.

I claim:

1. A coping jig comprising:
    a base having a flat top surface bounded on opposite sides by unobstructed edges;
    a pair of support blocks rising from the top surface of the base and each including an inclined support surface extending at an angle of 45° from the top surface, the inclined surfaces of the two blocks lying in a common plane that extends through said edges of the top surface;
and
    a means for holding crown molding upon the base and against the support blocks with one rear plane surface of the crown molding resting on the top surface of the base and with the inclined rear surface of the crown molding resting against the inclined support surfaces of the blocks, said holding means being removably mounted on said base and not obstructing said edges of the top surface.

2. A jig in accordance with claim 1 wherein said holding means comprises an elongated abutment extending parallel to said common plane and spaced from the intersection of said common plane and the top surface of said base.

3. A jig in accordance with claim 2 wherein said abutment includes projecting pegs that are received in bores in the top surfaces of said base.

4. a coping jig comprising:
    a base having a flat top surface bounded on opposite sides by unobstructed edges, said top surface including pairs of alinged holes;
    a pair of right angled isoceles triangular support blocks each having a pair of dowels extending from one equal side of the block and adapted to be received in a respective pair of holes in the base, the hypotenuse sides of the two blocks lying in a common plane that extends through said edges; and
    a means removably mounted on the base for holding crown molding on the top surface of the base and against the support blocks, said means not obstructing said edges.

5. A coping jig comprising:
    a base having a flat top surface bounded on opposite sides by unobstructed edges;
    a pair of support blocks rising from the top surfaces and each including an inclined support surface extending at an angle of 45° from the top surface with the inclined surfaces lying in a common plane that extends through said edges; and
    an abutment mounted on the top surface and spaced from and parallel to the intersection of said common plane and the top surface so that crown molding may be held against the support blocks with the inclined rear surface of the crown molding resting against the inclined support surfaces of the blocks and with one rear plane surface of the crown molding resting on the top surface between and against the abutment and the intersection, said abutment not obstructing said edges.

6. A jig in accordance with claim 5 wherein the top surface has sets of alinged bores spaced at different distances from the intersection and the abutment has depending pegs removeably received in the bores of a selected set.

* * * * *